United States Patent
Tabata

(10) Patent No.: US 9,616,788 B2
(45) Date of Patent: Apr. 11, 2017

(54) HEADREST WITH HEADREST STAY

(71) Applicant: TACHI-S CO., LTD., Akishima-shi (JP)

(72) Inventor: Tsuyoshi Tabata, Akishima (JP)

(73) Assignee: TACHI-S CO., LTD., Akishima-shi (JP)

( * ) Notice: Subject to any disclaimer, the term of this patent is extended or adjusted under 35 U.S.C. 154(b) by 0 days.

(21) Appl. No.: 14/888,842

(22) PCT Filed: May 13, 2014

(86) PCT No.: PCT/JP2014/062688
§ 371 (c)(1),
(2) Date: Nov. 3, 2015

(87) PCT Pub. No.: WO2014/192534
PCT Pub. Date: Dec. 4, 2014

(65) Prior Publication Data
US 2016/0059754 A1    Mar. 3, 2016

(30) Foreign Application Priority Data
May 31, 2013    (JP) .................................. 2013-115297

(51) Int. Cl.
*B60N 2/48*    (2006.01)
*B60N 2/70*    (2006.01)
*A47C 7/38*    (2006.01)

(52) U.S. Cl.
CPC .................. *B60N 2/48* (2013.01); *A47C 7/38* (2013.01); *B60N 2/4808* (2013.01); *B60N 2/7017* (2013.01)

(58) Field of Classification Search
CPC ...... B60N 2/28; B60N 2/4808; B60N 2/7017; A47C 7/38
(Continued)

(56) References Cited

U.S. PATENT DOCUMENTS 5,261,726 A * 11/1993 Yanagishita ......... B60N 2/4805
                                                          297/391
7,284,795 B2 * 10/2007 Sato ..................... B60N 2/4838
                                                          297/220
2007/0176479 A1    8/2007 Tabata

FOREIGN PATENT DOCUMENTS

JP          11 18868          1/1999
JP         2006 96125         4/2006
(Continued)

OTHER PUBLICATIONS

International Search Report Issued Aug. 12, 2014, in PCT/JP14/62688 Filed May 13, 2014.
(Continued)

*Primary Examiner* — Milton Nelson, Jr.
(74) *Attorney, Agent, or Firm* — Oblon, McClelland, Maier & Neustadt, L.L.P.

(57) ABSTRACT

A patch element 20 of a doughnut-like disc shape is fixedly provided, by sewing or adhesive, to a reverse surface of a seat-back-side area 12a defined in a trim cover assembly section covering a top region 12 of a headrest HR, in such a fashion that the patch element 20 circumscribes an entire edge of a headrest stay passage hole 14. Additionally, the patch element 20 is formed from a material capable of being impregnated with a liquid foaming agent injected in the trim cover assembly 2. Such patch element 20 has been impregnated with the liquid foaming agent S injected in the trim cover assembly 2 during a foaming process to form the headrest HR. Consequently, a density of the patch element 20 itself becomes extremely high, and therefore a strength of the patch element 20 can be increased to a great degree.

5 Claims, 2 Drawing Sheets

(58) Field of Classification Search
USPC .................................................. 297/391, 410
See application file for complete search history.

(56) References Cited

FOREIGN PATENT DOCUMENTS

| | | | |
|---|---|---|---|
| JP | 2007330577 A | * | 12/2007 |
| JP | 2008 206683 | | 9/2008 |
| JP | 4490213 | | 6/2010 |

OTHER PUBLICATIONS

Office Action issued Oct. 4, 2016, in Japanese Patent Application No. 2013-115297 (with English language translation).
Extended European Search Report issued Dec. 21, 2016 in European Patent Application No. 14804777.2.

* cited by examiner

HEADREST WITH HEADREST STAY

TECHNICAL FIELD

The present invention relates to a headrest so formed to include a main body portion having: a top region adapted to be mounted on or above an upper surface of a seat back of a seat; and a forwardly-overhanging suspended region which extends continuous from a front end of the top region in a downward direction so as to be in a suspended state on a forward side of the headrest. In particular, the invention is directed to a headrest of this kind which is formed by a foaming process involving the step of injecting a liquid foaming agent into an inside of a trim cover assembly that forms a surface cover element of the headrest and curing the liquid foaming agent into a foam padding filled in the trim cover assembly, together with a headrest stay, wherein a section of the trim cover assembly that covers the top region has, defined therein, a seat-back-side area adapted to face the seat back and allow its being contacted on the upper surface of the seat back, such seat-back-side area being formed with a headrest stay passage hole through which a rectilinear portion of the aforesaid headrest stay passes.

BACKGROUND ART

Conventionally, one example of headrests belonging to the above-noted technical field has been known from a Japanese Laid-Open Patent Publication No. 2006-96125. The headrest described in this literature typically comprises: a main body portion having a top region adapted to be mounted on or above an upper surface of a seat back and a forwardly-overhanging suspended region which extends continuous from a front end of the top region in a downward direction so as to be in a suspended state on a forward side of the headrest; and a headrest stay including a rectilinear portion exposed outwardly from the said top region of the main body portion. This prior art shows a trim cover assembly formed three-dimensionally by sewing in a shape of closed enclosure and describes that a base portion of the headrest stay is embedded in a foam padding filled in the trim cover assembly. Also, shown in the prior art is a headrest stay passage hole formed in the trim cover assembly, and through such headrest stay passage hole, the rectilinear portion of the headrest stay extends and is exposed outwardly. This kind of headrest is the so-called forwardly overhanging type of headrest.

PRIOR-ART LITERATURE

Patent-Related Document

Patent-related Document 1:
Japanese Laid-Open Patent Publication No. 2006-96125

SUMMARY OF THE INVENTION

Problems to be Solved by the Present Invention

The aforementioned conventional headrest of forwardly overhanging type is formed by the foaming process which results in the trim cover assembly being in an integral relation with the foam padding which is a polyurethane foam, wherein the trim cover assembly forms a surface cover element of the resulting headrest. However, in the headrest formed by this foaming process, the foam padding is in a tight and close contact with the trim cover assembly that forms the surface cover element. Further, due to the unique shape of the headrest, when the headrest is raised for adjustment in height, a load is applied to the headrest in a horizontal direction, thereby pressing the rectilinear portion of the headrest stay against the headrest stay passage hole intensively, which causes a great stress in localized areas of the trim cover assembly and foam padding in the vicinity of the headrest stay passage hole. These factors pose the problem that there is a high likelihood of the foam padding area adjacent to the headrest stay passage hole becoming depressed and permanently settled, as a result of which, the headrest stay passage hole may also be widened to cause separation of the adjacent foam padding area away from the rectilinear portion of the headrest stay.

It is a purpose of the present invention to provide a headrest of this kind which avoids the above-stated separation of foam padding area adjacent to the headrest stay passage hole from the headrest stay.

Means for Solving the Problem

In accordance with the present invention, there is provided a headrest comprising: a main body portion including a top region adapted to be mounted on or above an upper surface of a seat back of a seat; and a headrest stay including a rectilinear portion exposed outwardly from that top region of the main body portion, the headrest being characterized in that the headrest includes a trim cover assembly forming a surface layer of the main body portion, that an inside of the trim cover assembly is filled with a padding formed from a liquid foaming agent, that the trim cover assembly includes a cover section covering the top region, that such cover section has, defined therein, a seat-back-side area adapted to face the seat back and allow its being contacted on an upper surface of the seat back, that the seat-back-side area is formed with a headrest stay passage hole though which the rectilinear portion of the headrest stay passes, that a patch element is fixedly provided to an inward surface of the seat-back-side area in such a fashion that the patch element circumscribes an entire edge of the headrest stay passage hole, and that the patch element is formed from a material capable of being impregnated with the liquid foaming agent.

Preferably, the aforesaid main body portion may include a forwardly-overhanging suspended region which extends downwardly from a front end of said top region so as to be in a suspended state on a forward side of the headrest.

This headrest is formed by a foaming process involving the step of injecting a liquid foaming agent in the trim cover assembly and curing the liquid foaming agent into a foam padding integral with the trim cover assembly. As stated above, the headrest includes the main body portion having: the top region adapted to be mounted on or above the upper surface of the seat back, and the forwardly-overhanging suspended region which extends from the front end of the top region downwardly so as to be in a suspended state on a forward side of the headrest. This kind of headset is the so-called forwardly-overhanging type of headrest, which is in most cases applied to a rear seat. Also, the patch element is fixedly provided to an inward side of the aforesaid seat-back-side area defined in the trim cover assembly section covering the top region of the headrest. During a foaming process, the patch element has been impregnated with the liquid foaming agent (e.g. urethane of foaming property) injected in the trim cover assembly. Consequently, the patch element itself becomes extremely high in density and therefore a strength of the patch element can be increased to a great degree. Moreover, during the foaming process, so impregnated patch element achieves its firm integral connection with the foam padding that is formed from the liquid foaming agent, thereby positively preventing dislocation and removal of the patch element within the main body portion. In this context, the patch element may be formed from a metallic material that can not be impregnated with the liquid foaming agent, with a view to increasing a strength of the patch element. However, this could not be recommended, because the metallic patch element will not firmly attach to the foam padding, and further, during a long period of time in using the headrest, a tear or cut may easily occur in a particular area of the trim cover assembly that contacts an edge of the metallic patch element.

Preferably, the patch element may be formed in a doughnut-like disc shape in order to permit smooth and easy passage therethrough of the rectilinear portion of the headrest stay.

Preferably, the patch element may be fixedly secured by sewing or adhesive to the inward surface of the aforesaid seat-back-side area of the trim cover assembly in order to prevent dislocation of the patch element from the headrest stay passage hole that aligns the hole of that particular patch element.

Preferably, the patch element may have a hole through which the headrest stay passes, the hole having an inner diameter substantially equal to or slightly smaller than a diameter of the rectilinear portion of the headrest stay. This effectively achieves an integral firm attachment of the patch element to the rectilinear portion of the headrest stay.

Preferably, the patch element may be formed from a selected one of a foam wadding material, an unwoven fabric material, and a felt material, in order to permit its being easily impregnated with the liquid foaming agent.

Effects of the Invention

The present invention therefore avoids the likelihood that a localized area of the foam padding adjacent to the headrest stay passage hole may be separated away from the headrest stay.

MODE FOR CARRYING OUT THE INVENTION

Hereinaftter, with reference to the annexed drawings, a detailed description will be made of preferred embodiments of a headrest in accordance with the present invention.

Figure 1:
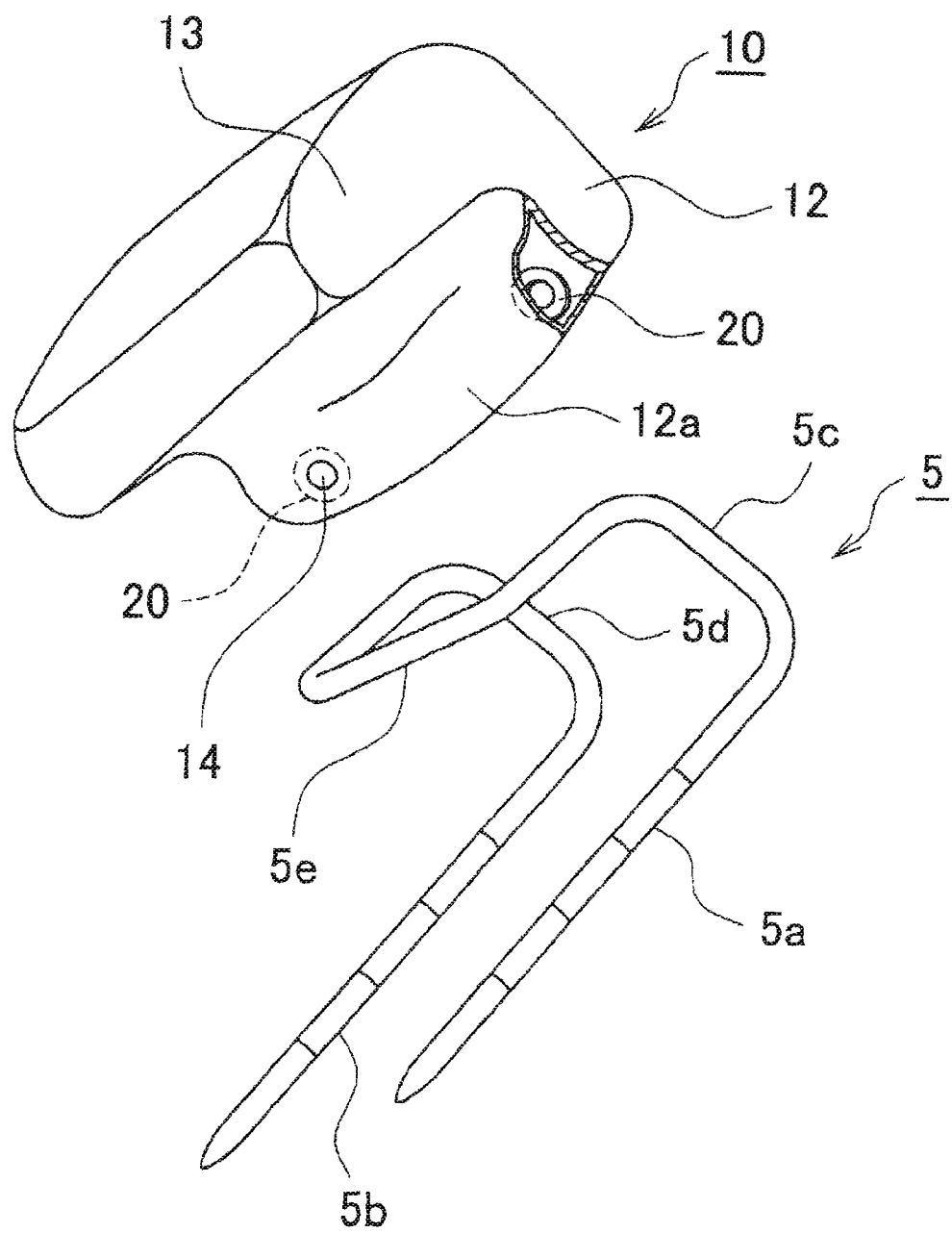
FIG. 1: An exploded perspective view showing one exemplary embodiment of a headrest in accordance with the present invention.
Figure 2:
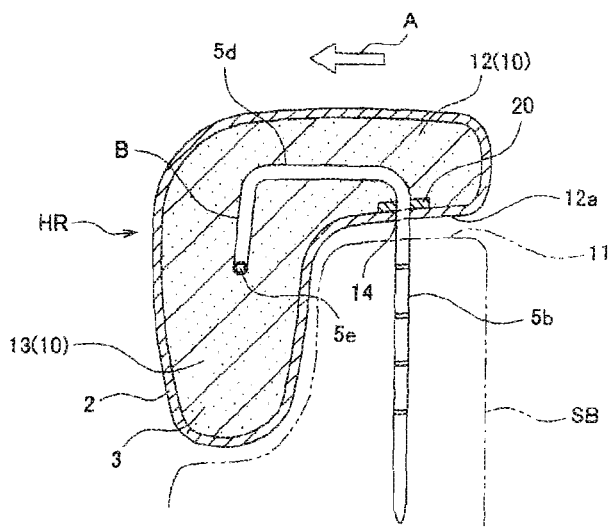
FIG. 2: A sectional view of the headrest.

In FIGS. 1 and 2, there is illustrated a headrest HR which is a foam product formed integrally with a trim cover assembly through a foaming process, the headrest therefore comprising: a trim cover assembly 2 formed three-dimensionally by sewing in a shape of closed enclosure; a foam padding 3 filled in that trim cover assembly 2 in an integral manner by a foaming process wherein a liquid foaming agent (e.g. urethane of forming property) is injected in the trim cover assembly and cured into an increased mass of the foam padding therein; and a headrest stay 5 partially secured fast in the foam padding 3.

The trim cover assembly 2, forming a surface cover element of the headrest, may preferably be of a two-layer lamination structure consisting of: an outer layer of non-breathable synthetic leather; and a foam wadding layer fixed to a reverse surface of such synthetic leather layer, wherein the foam wadding layer may be formed from a slab polyurethane foam material.

A main body portion 10 of the headrest HR is provided with: a top region 12 adapted to be mounted on or above an upper surface 11 of a seat back SB; and a forwardly-overhanging suspended region 13 which extends continuous from a front end of the top region 12 in a downward direction so as to be in a suspended state on a forward side of the headrest, With regard to the headrest stay 5, it is so formed to have the following portions: a first L-shaped portion 5c; a second L-shaped portion 5d, wherein those two L-shaped portions are embedded in the foam padding 3 so as to extend in parallel with each other; a connecting portion 5e extended horizontally between one end of the first L-shaped portion 5c and one end of the second L-shaped portion 5d, hence connecting the first and second L-shaped portions 5c and 5d; a first rectilinear portion 5a extending from the other end of the first L-shaped portion 5c; and a second rectilinear portion 5b extending form the other end of the second L-shaped portion 5d in parallel with the first rectilinear portion 5a. In this regard, it is to be understood that the first and second L-shaped portions 5c and 5d each has a forwardly-facing area B that is to face a forward side of the headrest, and most of such forwardly-facing areas B of the two L-shaped portions as well as the connecting portion 5e are situated within the forwardly-overhanging suspended region 13.

The trim cover assembly 2 has a section covering the top region 12 of the main body portion 10 of the headrest HR. This particular trim cover assembly section that covers the top region 12 has, defined therein, a seat-back-side area 12a adapted to face the seat back SB and allow its being contacted on the upper surface 11 of the seat back SE In such seat-back-side area 12a of the trim cover assembly 2, there are formed two headrest stay passage holes 14 through which the first and second rectilinear portions 5a and 5b of the headrest stay 5 pass, respectively.

In this sort of forwardly-overhanging type of headrest HR, the foam padding 3 made of a polyurethane foam is tightly and closely contacted with the trim cover assembly 2 that forms a surface cover element of the headrest. Further, due to the unique shape of the headrest, when the headrest is raised for adjustment in height, a load is applied to the main body portion 10 of the headrest along a horizontal direction indicated by the arrow A. For those reasons, it is of a high likelihood that the load will be imparted through the first and second rectilinear portions 5a and 5b to localized areas of the headrest in the vicinity of the two headrest stay passage holes 14, thereby causing corresponding great stresses thereat intensively. As a consequence thereof, there is a high possibility for the two stay passage holes to be so widened as to cause separation of the foam padding 3 from the corresponding localized areas of the first and second rectilinear portions 5a and 5b that must be contacted with that foam padding 3. This has been a problem peculiar to the forwardly overhanging type of headrest.

To solve the problem, in the present invention, two patch elements 20, each having a doughnut-like disc or annular shape, are fixedly secured by sewing or adhesive bonding to a reverse or inward surface of the aforesaid seat-back-side area 12a of the trim cover assembly, such that a hole of each annular patch element 20 entirely circumscribes each headrest stay passage hole 14, with an entire edge of the hole of the patch element slightly protruding inwards from an entire edge of the headrest stay passage hole 14. Therefore, each of the two patch elements 20 may be formed of a material so dimensioned to have: an outer diameter of approx. 30 mm; an inner diameter of its hole substantially equal to or slightly smaller than an outer diameter of each of the first and second columnar rectilinear portions 5a and 5b; and a thickness of approx 3 to 5 mm. This patch element 20, by the reason of its doughnut-like disc shape, permits smooth insertion and passage therethrough of the corresponding rectilinear portion of the headrest stay. Further, the patch element 20 is fixed to the reverse side of the seat-back-side area 12a as by sewing or adhesive, thereby preventing dislocation of the patch element 20 from the headrest stay passage hole 14 that aligns the hole of that particular patch element. With this arrangement, the two headrest stay passage holes 14 are maintained to be precisely circumscribed by the two holes of the two patch elements 20, respectively, while insuring that the entire edge of the hole of each patch element 20 slightly protrudes inwards from the entire edge of each headrest stay passage hole 14. As stated above, the patch element 20 has an inner diameter of its hole substantially equal to or slightly smaller than an outer diameter of each of the two columnar rectilinear portions 5a and 5b of the headrest stay 5. This arrangement indeed assures respective integral firm attachment of the two patch elements 20 to the two rectilinear portions 5a and 5b of the headrest stay 5, thereby preventing separation of the patch elements 20 from the corresponding rectilinear portions 5a and 5b of the headrest stay 5.

In addition, the patch element 20 is formed of a material that can be impregnated with a liquid foaming agent (e.g. urethane of foaming property) that is to be injected in the trim cover assembly 2 during a foaming process. For example, the patch element 20 may be formed from a foam wadding material, an unwoven fabric material, or a felt material.

Figure 3:
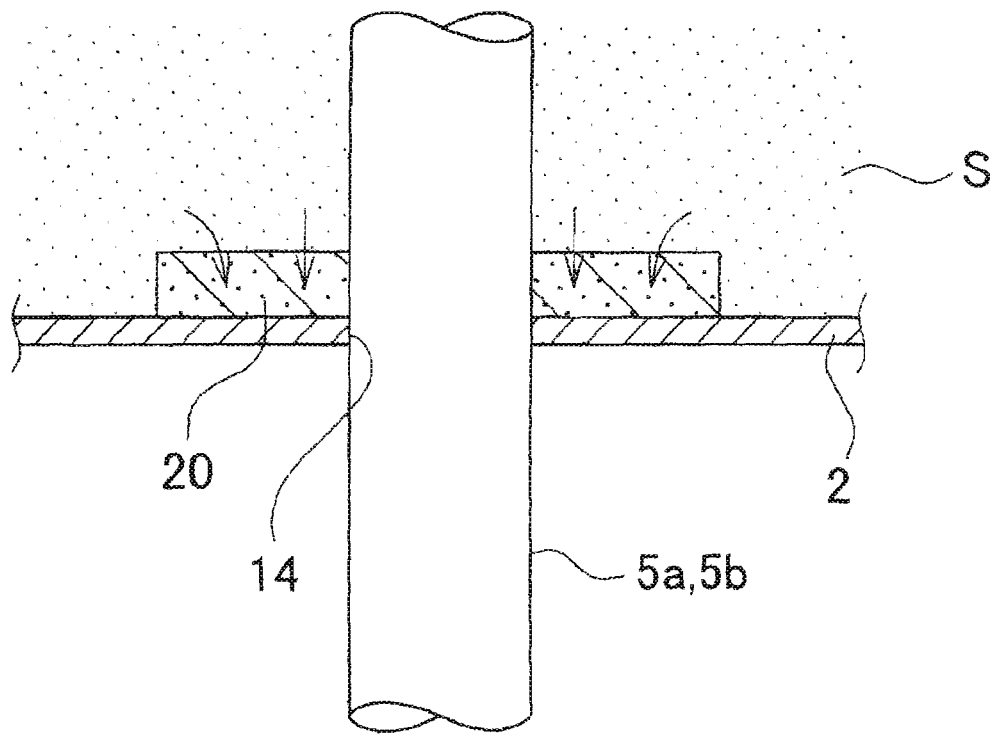
FIG. 3: An enlarged view showing a principle part of the headrest.

Accordingly, referring to FIG. 3, it is to be understood that, during a foaming process to form the headrest HR, the patch element 20 has been impregnated with a liquid foaming agent S (e.g. urethane of foaming property) injected in the trim cover assembly 2, with the result that the patch element 20 itself becomes extremely high in density. Thus, a strength of the patch element 20 can be increased to a required large degree.

Moreover, during the foaming process, so impregnated patch element 20 achieves its firm integral connection with the foam padding 3 that is formed from the liquid foaming agent S, thereby positively preventing dislocation and removal of the patch element 20 within the main body portion 10. This indeed avoids the previously-stated problem that the foam padding 3 may be separated by horizontally-applied load from the corresponding localized areas of the first and second rectilinear portions 5a and 5b that must be contacted with the foam padding 3.

In this context, the patch element 20 may be formed from a metallic material that can not be impregnated with the liquid foaming agent 5, with a view to increasing a strength of the patch element. However, this could not be recommended, because the metallic patch element will not firmly attach to the foam padding 3, and further, during a long period of time in using the headrest, a tear or cut may easily occur in a particular area of the trim cover assembly 2 that contacts an edge of the metallic patch element.

DESCRIPTION OF THE REFERENCE NUMERALS

2 . . . trim cover assembly 3 . . . foam padding 5 . . . headrest stay 5a and 5b . . . two rectilinear portions of the headrest stay, respectively.
10 . . . main body portion 12 . . . top region
12a . . . seat-back-side area 13 . . . forwardly-overhanging suspended region
14 . . . headrest stay passage hole 20 . . . patch element HR headrest
S . . . liquid foaming agent SB . . . seat back

The invention claimed is:

1. A headrest comprising:
a main body portion including a top region adapted to be mounted on or above an upper surface of a seat back of a seat, said main body portion comprising:
   a foam padding; and
   a trim cover assembly forming a surface layer of said main body portion, said trim cover assembly covering said foam padding, said foam padding formed from a liquid foaming agent injected in said trim cover assembly and filled therein by a foaming process; and
a headrest stay including:
   a portion secured in said foaming padding of said main body portion; and
   a columnar rectilinear portion which extends continuously from said portion and is exposed outwardly from said top region of said main body portion,
wherein said trim cover assembly includes a cover section covering said top region of said main body portion,
said cover section has, defined therein, a seat-back-side area adapted to said upper surface of said seat back and allow its being contacted on said upper surface, said seat-back-side area is formed with a circular headrest stay passage hole through which said columnar rectilinear portion of said headrest stay passes, such that said circular headrest stay passage hole surrounds said columnar rectilinear portion;
said columnar rectilinear portion has an area embedded in said foam padding at said circular headrest stay passage hole, said area contacting said foam padding;
a patch element is formed from a material impregnable with said liquid foaming agent, said patch element having a circular hole through which said columnar rectilinear portion of said headrest stay passes, said circular hole being aligned with said circular headrest stay passage hole and circumscribing an entire circular edge of said circular headrest stay passage hole;
said patch element is disposed between said foam padding and an inward side of said seat-back-side area, said inward side of said seat-back-side area facing said foam padding;
said patch element is fixedly secured by sewing or adhesive to said inward side of said seat-back-side area, thereby preventing dislocation of said circular hole of said patch element from said circular headrest stay passage hole; and
said patch element is further impregnated with said liquid foaming agent and hardened during said foaming process and being thereby integrally, firmly connected with said foam padding filled in said trim cover assembly, with a strength of said patch element being thereby increased, so that a portion of said foam padding, which contacts said area of said columnar rectilinear portion, is prevented by the thus-impregnated and hardened patch element from being separated from said area of said columnar rectilinear portion,
whereupon said seat-back-side area, said patch element, and said foam padding are integrally connected with one another at a location surrounding said circular headrest stay passage hole, thereby not only preventing separation of said circular headrest stay passage hole from said columnar rectilinear portion, but also preventing separation of said portion of said foaming padding from said area of said columnar rectilinear portion.

2. The headrest as described in claim 1, wherein said main body portion includes a forwardly-overhanging suspended region which extends downwardly from a front end of said top region so as to be in a suspended state on a forward side of the headrest.

3. The headrest as described in claim 1, wherein said patch element is formed in an annular shape.

4. The headrest as described in claim 1, wherein said patch element is formed from a selected one of a foam wadding material, an unwoven fabric material, and a felt material.

5. The headrest as described in claim 1, wherein said hole has an inner diameter substantially equal to or slightly smaller than a diameter of said rectilinear portion of said headrest stay.

\* \* \* \* \*